A. E. FLOWERS.
METHOD AND MACHINE FOR DETERMINING VISCOSITY.
APPLICATION FILED AUG. 29, 1913.
1,247,523. Patented Nov. 20, 1917.
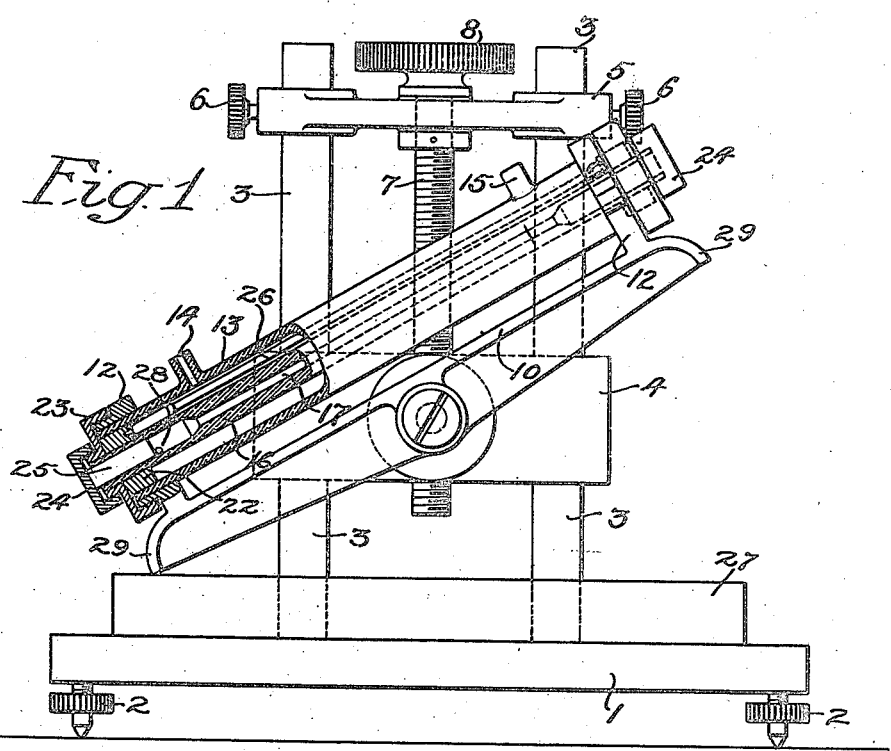

UNITED STATES PATENT OFFICE.

ALAN E. FLOWERS, OF SCHENECTADY, NEW YORK, ASSIGNOR TO TINIUS OLSEN TESTING MACHINE COMPANY, OF PHILADELPHIA, PENNSYLVANIA, A CORPORATION OF PENNSYLVANIA.

METHOD AND MACHINE FOR DETERMINING VISCOSITY.

1,247,523.

Specification of Letters Patent.

Patented Nov. 20, 1917.

Application filed August 29, 1913. Serial No. 787,303.

*To all whom it may concern:*

Be it known that I, ALAN E. FLOWERS, a citizen of the United States, and a resident of Schenectady, Schenectady county, New York, have invented Improved Methods and Machines for Determining Viscosity, of which the following is a specification.

One object of my invention is to provide a novel method of determining the viscosity of liquids or of comparing their viscosities throughout a wide range.

Another object of the invention is to provide a relatively simple, easily manipulated, inexpensive and relatively accurate device for measuring the viscosity of liquids, it being especially desired that the apparatus shall be conveniently adjustable to suit it for use in making tests of liquids whose viscosity varies between wide limits.

These objects and other advantageous ends I secure as hereinafter set forth, reference being had to the accompanying drawings in which, Figure 1 is a front elevation, partly in section, of a machine constructed according to my invention, in which my novel method of determining or comparing viscosities may be carried out;

Fig. 2 is a plan of the apparatus shown in Fig. 1; and

Fig. 3 is a plan of the testing tube.

In the above drawings 1 represents a suitable base structure preferably provided with leveling screws 2 and supporting a pair of substantially vertical standards 3 in the form of two bars of circular section. The upper ends of these bars are connected by a plate 5 held in any desired position above the base 1 by clamping or set screws 6, and on said bars is slidably mounted a cross head 4 provided with a vertically extending threaded passage mid-way between said standards or bars 3, for the reception of a screw 7 whose head 8 is rotatably mounted in the plate 5. By means of this screw, the cross head 4 may be adjusted to vary its distance above the base 1, and in addition, by slacking the set screws 6, the plate 5 and with it the cross head 4 may be adjusted up or down on the standards 3.

Projecting horizontally from the cross head 4 is a spindle 9 on which is rotatably mounted an oscillatory arm 10 hereafter referred to as the slant limb, removably held in place by a screw 11 entering or forming part of said spindle. This slant limb is provided with bearings 12 at points equally distant from its central bearing for the reception of a longitudinally extending glass or other transparent tube 13 having an inlet 14 and an outlet 15 for heating or cooling fluid.

Mounted concentrically within this tube 13 is a testing tube 16 likewise of glass or other transparent material and preferably of the construction shown in Fig. 3. As here illustrated, this tube has an elongated bore or passage 17 which at its end portions is preferably, though not necessarily, enlarged as indicated at 18, it being noted that the enlarged portions are of relatively short length and are connected to the smaller diameter central bore by frusto conical sections 19. At suitable points adjacent the ends of the smaller bore portion 17 or at any other desired points I preferably provide transit marks 20 and 21.

The tube 16 preferably extends through and beyond the heads 22 whereby it is supported within the tube 13 and any desired form of stoppers may be provided for closing its ends, such for example, as the caps 23 which are shown as designed to screw upon suitably threaded projections from the bearings 12 and which are also threaded to receive the flanged stopper heads 24 attached in any suitable manner to stoppers 25 fitting the enlarged portions 18 respectively of the said tube 16. If desired, a thermometer 26 may be mounted within the tube 13 so as to give an indication of the temperature of any liquid or gas delivered around the tube 16, and within this latter is placed a sphere or other suitably formed solid body 28 whose dimensions are such that it is free to roll with more or less clearance through the small bore portion 17 of said tube. Upon the base 1, I preferably mount an elongated parallel sided bar 27 so placed as to be engaged by suitably formed edges 29 at the ends of the slant limb 10, when this lies at either extremity of its possible arc of oscillation.

With the above described arrangement of parts, the liquid whose viscosity is to be tested is introduced into the tube 15, with the ball or other movable member 28, and after the stopper 25 has been replaced, said liquid is brought to and is maintained at any desired temperature, as indicated by the thermometer 26, by fluid from a suitable source circulated through the tube 13 by pipes attached to the inlet 14 and outlet 15. By suitable manipulation of the screw head 8, the cross head 4 is brought to such a height above the base 1, or above the top of the stop bar that the slant limb 10 will lie at a predetermined angle to the horizontal when either of its edges 29 rests on said bar. Thereafter the slant limb 10 is rotated on its spindle 9 from the position shown in Fig. 1 to a similar but oppositely inclined position with its second edge 29 in engagement with the top surface of the stop 27, and by any suitable means, note is made of the time required for the ball 28 or other movable body such as a disk to roll through the liquid in the tube 16 between the two marks 20 and 21, the viscosity of said liquid being directly proportional to this time, or inversely proportional to the velocity of movement of said ball. So long as the velocity of the ball 28 is not too high, this relation between the velocity of the ball and viscosity of the liquid will hold good.

When it is desired to remove or replace the liquid to be tested, this may be quickly accomplished by removing one of the stoppers 25 with its cap 24, it being obvious that with the construction employed, I may quickly and conveniently clean the inside of the testing tube whenever desired. If it is desired, check readings may be obtained by reversing the direction in which the ball rolls through the tube 16, this being accomplished by rotating the slant limb 10 on its spindle in the direction opposite to that just indicated, the velocity of movement of the ball being noted as before.

By any suitable means, measurements under pressures other than that of the atmosphere may be made by connecting the ends of the tube 16 to any suitable source of pressure. If it be desired to vary the angle at which the tube 16 is supported while the ball 28 is rolling through the body of liquid within the same, I may raise or lower the cross head 4 upon the standards 3 by suitable manipulation of the screw head 8.

By reason of the provision of the inclosing tube 13 the temperature of the liquid in the tube 16 may be maintained constant at any desired point, determined as before noted, by any desired means such as the passage of hot or cold fluid around the tube 16 through said inclosing tube. The amount of clearance between the ball 28 and the walls of the bore 17 may be varied within relatively wide limits although I prefer that the diameter of the ball shall be from one-half to three-quarters of that of the bore of the tube.

It is to be understood that I may employ balls of different densities in order to test liquids of different viscosities, and may likewise have the transit points 20 and 21 at different distances apart as may be found most convenient.

It is to be particularly noted that by the use of my apparatus above described, it is possible to obtain results of relatively high accuracy. Moreover it is possible to use but a relatively small quantity of any given liquid in order to determine its viscosity, and under the conditions of the test, the liquid is protected from evaporation as well as from the effects of the temperature of the surrounding air. The observations necessary for a test may be made in a relatively short time and the apparatus may be easily and quickly adjusted to suit it for tests with the slant limb at various angles, in order to suit it for use with liquids of widely differing viscosities.

It is to be understood that while I have shown a definite combination of parts for carrying out my invention, I do not limit myself to this particular construction, but may use other forms of apparatus embodying the principles of the above described invention.

While in the above description I have shown the apparatus as employing but a single testing tube 16, it is to be understood that two or more such tubes may be used when it is desired to make direct comparisons of the viscosities of two different liquids.

I claim:—

1. The step in the method of ascertaining the viscosity of a liquid which consists in determining the velocity at which a ball moves through a column of said liquid of predetermined length and whose diameter is one-quarter to one-half greater than the diameter of said ball.

2. The method of determining the viscosity of a liquid which consists in causing a solid body to roll through a column of said liquid; and observing the time required for said body to pass through a predetermined length of said column.

3. A viscosity meter consisting of a supporting structure; means, including a tube of transparent material, mounted on said structure and free to tilt in a vertical plane; with a body of solid material of a cross section materially smaller than that of the tube bore and free to move through the same when the tube occupies an inclined position.

4. The combination of a supporting structure having a horizontal pivot; a slant limb mounted on said pivot; means for limiting the movement of said limb; a transparent tube carried by the slant limb; and a body of solid material free to roll through the tube, when it is inclined.

5. A viscosity meter consisting of a supporting structure; means, including a transparent tube, mounted on said structure so as to be free to tilt in different directions; with a ball free to roll through said tube.

6. A viscosity meter consisting of a supporting structure having a standard; a cross head vertically adjustable on said standard and provided with a horizontal pivot; a slant limb mounted on said pivot; a transparent tube carried by said slant limb; and a member in the tube free to move through the same when it is inclined.

7. A viscosity meter consisting of a supporting structure having a standard; a cross head vertically adjustable on said standard and provided with a horizontal pivot; a slant limb mounted on said pivot; a transparent tube carried by said slant limb; a member in the tube free to move through the same when it is inclined; with means for preventing movement of the slant limb beyond either of two positions in which it is oppositely and equally inclined to the vertical.

8. The combination of a supporting structure having a horizontal pivot; a slant limb mounted on said pivot and having stop-engaging portions on opposite sides of and at equal distances from said pivot; a stop device on the supporting structure placed to engage said portions of the slant limb to prevent movement of the same beyond two oppositely and equally inclined positions; a transparent tube carried by the slant limb; and a member free to move through the tube when it is inclined.

9. A viscosity meter consisting of a supporting structure having a supporting standard; an adjusting screw carried thereby; a cross head slidable on the standard and engaged by said adjusting screw; a horizontal pivot on the cross head; a slant limb mounted on the pivot; means for preventing movement of said slant limb beyond predetermined positions; a transparent tube carried by the slant limb for the reception of liquid to be tested; and a ball in said tube.

10. The combination of a transparent tube for liquid to be tested; a body of solid material therein free to roll between predetermined points; means for pivotally supporting said tube; means for preventing movement of the tube on said supporting means beyond two equally but oppositely inclined positions; and means for varying the angle of inclination of the tube at the ends of its possible path of movement.

11. A structure for testing the viscosity of liquids comprising a supporting standard; a beam pivotally mounted on said standard; a transparent tube disposed on said beam, an inner transparent tube within said first named tube; and an inlet and outlet for said first named tube, as described.

12. A structure for testing the viscosity of liquids comprising a supporting standard; a transparent tube pivotally mounted on said supporting standard and arranged to receive and discharge a liquid, said tube being provided with a plurality of indicating marks along its length; and a sphere disposed in rolling relation within said tube and adapted to move through the liquid and be visible along the line of said indicating marks, as described.

13. A structure for testing the viscosity of liquids comprising inner and outer transparent tubes; the space between the two being closed at the ends; an inlet and an outlet for said outer tube; a sphere disposed in said inner tube; and means for pivotally mounting said tube, as described.

14. A structure for testing the viscosity of liquids comprising a transparent tube; means for adjusting said tube to definite angles of inclination; and a sphere of greater specific gravity than the liquid disposed in rolling relation within said tube and being visible therethrough, as described.

15. A structure for testing the viscosity of liquids comprising a transparent tube arranged to be set in different positions and being provided with inlets and outlets having removable closures; and a sphere of greater specific gravity than the liquid disposed in rolling relation within said tube, as described.

16. A structure for testing the viscosity of liquids comprising a supporting standard; a transparent tube pivotally mounted on said supporting standard, such tube being open at each end, said tube being arranged to receive a liquid; means for closing the open ends of said tube; and a sphere disposed in rolling relation within said tube and adapted to move through the liquid, as described.

17. A structure for testing the viscosity of liquids comprising a transparent tube arranged to be set at various angles to the horizon, such tube being provided with a transparent jacket; and a sphere disposed in rolling relation within said tube, as described.

In testimony whereof, I have signed my name to this specification, in the presence of two subscribing witnesses.

ALAN E. FLOWERS.

Witnesses:
STEPHEN A. WOLONGIEWICZ,
MARY RASSO.